US006256102B1

(12) United States Patent
Dogariu

(10) Patent No.: US 6,256,102 B1
(45) Date of Patent: Jul. 3, 2001

(54) DUAL-BEAM LOW-COHERENCE INTERFEROMETER WITH IMPROVED SIGNAL-TO-NOISE RATIO

(75) Inventor: Aristide Dogariu, Oviedo, FL (US)

(73) Assignee: University of Central Florida, Orlando, FL (US)

( * ) Notice: Subject to any disclaimer, the term of this patent is extended or adjusted under 35 U.S.C. 154(b) by 0 days.

(21) Appl. No.: 09/300,528

(22) Filed: Apr. 27, 1999

(51) Int. Cl.[7] .................................................. G01B 9/02

(52) U.S. Cl. .......................................... 356/479; 356/450

(58) Field of Search ................................... 356/479, 450, 356/477

(56) References Cited

U.S. PATENT DOCUMENTS

| | | | |
|---|---|---|---|
| 4,221,486 | 9/1980 | Jaerisch | 356/357 |
| 4,492,467 | 1/1985 | Drain et al. | 356/336 |
| 5,469,259 | 11/1995 | Colby et al. | 356/351 |
| 5,491,550 | 2/1996 | Dabbs | 356/345 |
| 5,619,326 | 4/1997 | Takamatsu et al. | 356/357 |
| 5,682,240 | 10/1997 | Redlitz | 356/349 |
| 5,694,216 | 12/1997 | Riza | 356/349 |
| 5,696,579 | 12/1997 | Johnson | 356/35.5 |
| 5,716,324 | 2/1998 | Toida | 600/160 |
| 5,748,313 | 5/1998 | Zorabedian | 356/345 |

OTHER PUBLICATIONS

Flournoy, Optics in DuPont, Applied Optics, Apr., 1972, pp. 1905–1906.
Flournoy, White–Light Interferometric Thickness Gauge, Applied Optics, Apr., 1972, pp. 1907–1915.
Okamoto et al., Fourier Transform Spectrometer with a Self–Scanning Photodiode Array, Applied Optics, Jan., 1984, pp. 269–273.
Tatsuno et al., Diode Laser Direct Modulation Heterodyne Interferometer, Applied Optics, Jan., 1987, pp. 37–40.
Youngquist et al., Optical Coherence Domain Reflectometry: a New Optical Evaluation Technique, Optical Society of Am., Mar., 1987, pp. 158–160.
Danielson et al., Guided–Wave Reflectometry with Micrometer Resolution Applied Optics, Jul., 1987, pp. 2836–2842.
Todia et al., Experimental Verification of Image Detection in Highly Scattering Media Using Antenna Properties Optical Heterodyne Microscope Scheme, May, 1990, pp. 700–702.
Kabayshi et al., Polarization–Independent Interferometric Optical–Time–Domain Reflectometer, Journal of Lightwave Technology, May, 1991, pp. 623–628.
Danielson et al., Absolute Optical Ranging Using Low Coherence Interferometry, Applied Optics, Jul., 1991, pp. 2975–2979.
Huang et al., Optical Coherence Tomography, Reports, Nov., 1991, pp. 254–257.

(List continued on next page.)

Primary Examiner—Frank G. Font
Assistant Examiner—Andrew H. Lee
(74) Attorney, Agent, or Firm—The Law Offices of Brian S. Steinberger

(57) ABSTRACT

A dual beam low coherence interferometer with improved signal to noise ratio. The interferometer directs both a collimated beam about a focused beam to a target. A detector detects the multiscattering from the target with a splitter where a reference arm with matched mirrors allows for measuring both the intensity and magnitude values of the beam to be measured. The intensity and magnitude values indicate the imaging of the target in applications such as OCT(optical coherence tomography) having medical imaging applications, while improving the signal to noise ratios. Other applications include material characterization in ceramics, composites and other granular material. Additionally, the interferometer can be used to image target defects such as inclusions, voids, cracks, and the like, in ceramics and other materials which scatter light.

18 Claims, 7 Drawing Sheets

OTHER PUBLICATIONS

Clivaz, et al., High–resolution Reflectometry in Biological Tissues, Optical Society of America, Jan., 1992, pp. 4–6.

Swanson et al., High–speed Optical Coherence Domain Reflectometry, Optical Society of America, Jan., 1992, pp. 151–153.

Hitzenberger, Measurement of Corneal Thickness by Low–coherence Interferometry, Applied Optics, Nov., 1992, pp. 6637–6642.

Knuttel et al., Stationary Depth–profiling Reflectometer Based on Low–coherence Interferometry, Optics Communications, Oct., 1993, pp. 193–198.

Booster et al., Design of a Precision Optical Low–Coherence Reflectometer, Hewlett–Packard Journal, Feb., 1993, pp. 39–48.

Chou et al., High–Resolution and High–Sensitivity Optical Reflection Measurements Using White–Light Interferometry, Hewlett Packard Journal, Feb., 1993, pp. 52–59.

Liu et al., Partially Multiplexing Sensor Network Exploiting Low Coherence Interferometry, Applied Optics, Mar., 1993, pp. 1100–1103.

Chiang et al., Imaging Through Random Scattering Media by Using CW Broadband Interferometry, Optical Society of America, Jan., 1993, pp. 546–548.

DUAL-BEAM LOW-COHERENCE INTERFEROMETER WITH IMPROVED SIGNAL-TO-NOISE RATIO

This invention relates to interferometers, and in particular to a dual beam interferometer measuring head/probe apparatus that simultaneously measures both a collimated cylindrical beam around a focused beam to a target(such as human tissue cells), and detects the multiscattering from the target with a splitter where a reference arm with matched mirrors allows for measuring both the intensity and magnitude values of the beam to be measured, wherein the intensity and magnitude values indicate the imaging of the target in applications such as OCT(optical coherence tomography) having medical imaging applications, while improving the signal to noise ratios.

BACKGROUND AND PRIOR ART

Speckle type noise is generally present in signals recorded when low-coherence interferometry is applied to characterize targets such as tissue samples that are surrounded by random media. The speckle noise is generally comprised of intensity contributions arising from multiple scattering loops which are collected by the optical system and which interfere during the temporal coherence interval. Because of the noise level, prior art types of low-coherence technique lack quantitative capabilities such as quantifying the optical contrast between the targeted region and the surroundings and are limited in use.

Optical noise present in low-coherence images is generally determined by the presence of multiple light scattering trajectories that have similar lengths as the ballistic component and that are collected by the measuring head. FIGS. 1A–1C show scattering paths having a total length such that the paths differ with less than the coherence length of illumination source will interfere and will generate the background component. FIG. 1A shows a Path A which refers to a single backscattered signal. FIG. 1B shows a Path which B refers to multiple forward scattering signals. FIG. 1C shows a path C which refers to multiple scattering signals. FIGS. 1A–1C show that due to the round-trip geometry of the paths, the actual penetration depths can be smaller than the actual depth of the target(see path C). Single backscattering contribution, paths of type A(FIG. 1A), and mostly forward scattering loops of type B(FIG. 1B) can have similar path lengths(within the coherence length of the source) and, therefore, contribute to the recorded signal. However, loops of type B(FIG. 1B) determine the beam spread and reduces the resolution.

The most difficult problem is to distinguish between paths of types A and B. The sizes of the scattering centers (scattering particles) in tissue are usually larger than the wavelengths. Accordingly, there is a strong forward scattering, which precludes the use of polarization-based methods to isolate these multiple scattering contributions.

Conventional approaches to reduce the optical noise in low-coherence techniques are to limit the measurements for targets at sufficiently small depths, to use low numerical aperture for the probe beam, to work at wavelengths such that the scattering is reduced, or decreases the coherence length. Besides reducing the number of multiple scattering events that are collected, the prior art approaches also affect the contrast, resolution, and penetration depth of a low coherence technique.

Based on a priori knowledge on the scattering, absorption, and structural characteristics, one can account for multiple scattering effects of path types B and C of FIG. 1. In applications where priori information such as particle size distribution, composition, and spatial location of scattering particles are known, scattering models can be used to derive the contribution of multiple scattering. The relative probability to generate paths of types A, B, and C from layers of thickness $L_c$ at the depth z(as shown in FIG. 1A), can be calculated if the optical characteristics such as cross sections, single scattering albedo and phase function, structural correlation's, layering, optical density of the surrounding medium are known. In FIGS. 1A–1C, source 40 can be an illumination light source, 10 is the air medium, 20 is the tissue being tested and 30 can be the subterranean target within the tissue, with $L_c$ is the coherence length of the light source, and Z is the depth within the tissue 20 to the target 30. The air-tissue interface shown in FIGS. 1A–1C, is only one example, interferometers can also be used in applications such as defect locations.

FIG. 2 illustrates how the multiple scattering contributions depend on the targeted depth z. The amount of multiple scattering contributions to the recorded signal depends not only on the depth value z but also on the coherence length $L_c$ and the optical characteristics of the medium between the interface and the targeted depth.

Referring to FIG. 2, probing the medium 20 at a higher depth actually enlarges the volume probed by OCT(optical coherence tomography). At higher depths, paths of types B and C become increasingly more probable adding their contribution to the background noise and decreasing both the axial and transversal resolution. Thus, the longer the depth the greater the noise. The complexity precludes a simple estimation of the multiple scattering background (noise level).

Various types of interferometers have been proposed over the years but fail to overcome all the problems described above. See for example U.S. Pat. No. 4,221,486 to Jaerisch et al.; U.S. Pat. No. 4,492,467 to Drain et al.; U.S. Pat. No. 5,469,259 to Golby et al.; U.S. Pat. No. 5,491,550 to Dabbs; U.S. Pat. No. 5,619,326 to Takamatsu et al.; U.S. Pat. No. 5,682,240 to Redlitz; U.S. Pat. No. 5,694,216 to Riza; U.S. Pat. No. 5,696,579 to Johnson; U.S. Pat. No. 5,716,324 to Toida; and U.S. Pat. No. 5,748,313 to Zorabedian.

SUMMARY OF THE INVENTION

The first objective of the present invention is to provide a dual beam low-coherence interferometer with a focused beam and a collimated beam having identical wavelengths, coherence and path length properties for imaging applications.

The second object of this invention is to provide a dual beam low-coherence interferometer with a focused beam and a collimated beam which are used in real-time applications to reduce background scattering noise and improve the signal to noise ratio in imaging applications.

The third object of this invention is to provide a dual beam low-coherence interferometer with a focused beam and a collimated beam to enhance image resolution and increase penetration depth imaging.

The fourth object of this invention is to provide a dual beam low-coherence interferometer with a focused beam and a collimated beam for optical coherence tomography and microscopy applications.

The fifth object of this invention is to measure the effects of a single backscattered signal, multiple forward scattering signals, and multiple scattering signals in an OCT(optical coherence tomography) system without knowledge of optical characteristics such as cross sections, single scattering albedo and phase function, structural correlation's, layering, and optical density of the surrounding medium being sampled, and using layers of thickness $L_c$ at a depth z. Once depth-dependent contributions of multiple scattering loops are known for a specific medium, the contributions can be subtracted from measured data for improved axial resolution and contrast.

A preferred embodiment of the novel dual beam low-coherence interferometer with improved signal-to-noise ratio includes a low coherence light source, a first lens for forming a collimated beam from the light source onto a subsurface target such as but not limited to tumors, abnormal cells in biological tissues, and defects such as inclusions, cracks, and voids within composite materials such as ceramics. The novel interferometer further includes a second lens for forming a focused beam from the light source onto the target, and a detector for detecting the frequency of the collimated beam and the frequency of the focused beam from the target. The collimated beam can alternatively be formed by a collimator. The optical signal transmission medium within the interferometer can be based on optical fibers. Alternatively, the transmission medium within the interferometer can be an open-air based system.

Further objects and advantages of this invention will be apparent from the following detailed description of a presently preferred embodiment which is illustrated schematically in the accompanying drawings.

DESCRIPTION OF THE PREFERRED EMBODIMENT

Before explaining the disclosed embodiment of the present invention in detail it is to be understood that the invention is not limited in its application to the details of the particular arrangement shown since the invention is capable of other embodiments. Also, the terminology used herein is for the purpose of description and not of limitation.

Figure 3:
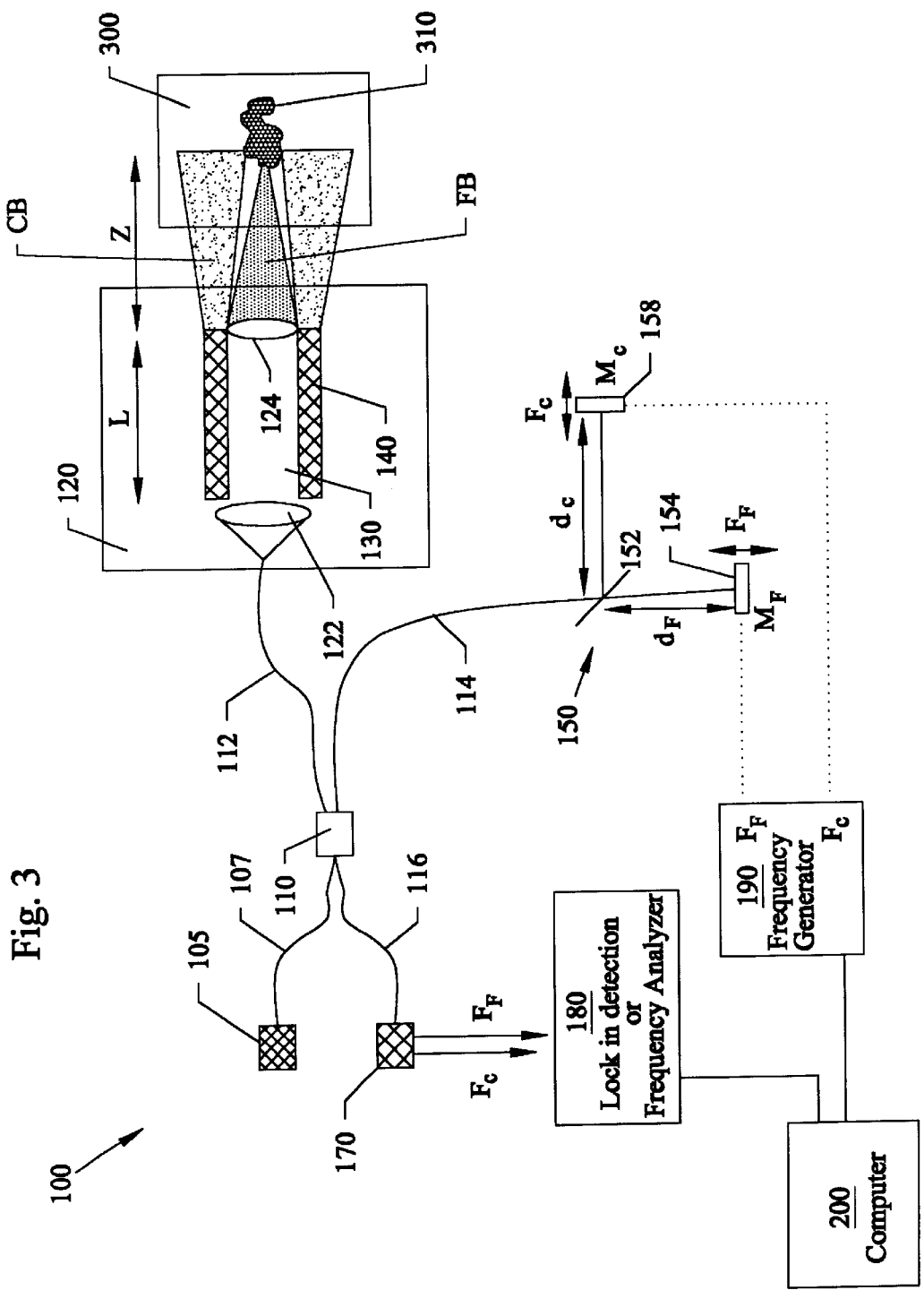
FIG. 3 shows a component set-up of a preferred embodiment of the dual beam low-coherence interferometer system.

FIG. 3 shows a component set-up of a preferred embodiment of the dual beam low-coherence interferometer system 100 having improved signal-to-noise ratios. Referring to FIG. 3, a low-coherence source 105 such as a superluminescent diode Hamamatsu L3302 having a wavelength of approximately 830 nm, couples the light through an optical fiber 107 to a 2×2 beam splitter 110 such as a Newport, and through optical fibers 112 to an optical head 120 and through optical fiber 114 and to the reference arm 150 of the interferometer 100. Optical fiber 116 couples light to a light detector 170 such as a New Focus Nirvana balanced detector. The measuring head 120 can have a cylindrical geometry and consist of two convergent lens 122, 124 and a cylindrical waveguide with two different refractive indices m and n. Convergent lens 122 and 124 can each be a Newport F-L40B.

Referring to FIG. 3, light that passes through the medium 130 with refractive index m is further focused by a second smaller aperture lens 124, which generates the focused probing beam FB. Light propagating through the medium 140 with a higher refractive index n generates a quasi-collimated beam that propagates along the same optical axis as the focused beam FB. For ballistic light propagation at depth z, the total optical path in the measuring head 120 and investigated medium is $Ln+zn_r$, and $Lm+zm_r$, for the collimated beam CB, and the focused beam FB, respectively. If the difference between these two optical paths is larger than the coherence length of the illumination source $L_c$, the contributions in the two beams (CB, FB) can be independently measured when appropriate optical path differences are introduced in the reference arm of the interferometer $dc=Ln+zn_r$, and $df=Lm+zn_r$. In the reference arm 150, modulations of different frequencies $F_C$ and $F_F$ are introduced at the two mirrors $M_C$ 158, and $M_F$ 154, and, therefore, the detector 170 will read modulation amplitudes which are proportional with the backscattered signals generated by the collimated beam CB, and the focused beam FB, respectively.

Referring to FIG. 3, when the optical head 120 is aimed at the investigated medium 300 containing multiple scattering centers(as shown in the preceding figures) and a target 310, the signal from the target 310 is measured by lock in detection or frequency analysis 180 at the frequency Ff that is introduced at the mirror Mf 154 such as a Thor Labs piezoelectric modulator. The distance dF is matched to the depth z of the target 310. The signal from the detection unit 170 can be frequency filtered for increasing the sensitivity, and is digitized through a data acquisition unit 180 such as a National Instruments Labview, and can be stored and displayed by a personal computer 200 such as an IBM PC. Simultaneously, a similar detection is performed for the frequency Fc which is introduced by the piezoelectric modulator-mirror Mc 158, which matches the optical path difference corresponding to the collimated beam CB. Computer 200 can also control the frequency generator 190 which output selected F the frequency Ff for Mirror Mf and the frequency Fc for mirror Mc. As a result two signals can be recorded in the computer 200 corresponding to backscattered intensities in the collimated beam CB, and focused beam FB, respectively. Further processing, such as dividing the focused and the collimated signals, will offer the amplitude of the scattering from the target relative to scattering from the surrounding medium enhancing therefore the signal to noise ratio.

In a low-coherence microscopy operation mode, the collimated beam provides a measure of the overall optical noise corresponding to a geometry where the reading is performed at the depth z. In the mean time, the focused beam generates the main reflectance signal and determines the spatial resolution. Subsequent processing can be developed using the collimated signal for establishing the real background in the image recorded with focused beam. According to the specific optical geometry(N/A, z and diameter of the collimated beam) a multiple scattering contribution per unit volume can be estimated and subtracted from the main reflectance signal. In this manner, the effect of multiple scattering is directly quantified for a specific depth z enhancing therefore the signal-to-noise-ratio in the low-coherence image.

In a tomographic operation mode, lateral scanning is introduced simultaneously in both collimated beams(CB) and focused beams(FB). This permits to account for specific background noise effects at different locations along the scan.

Figures 1A, 1B, 1C:
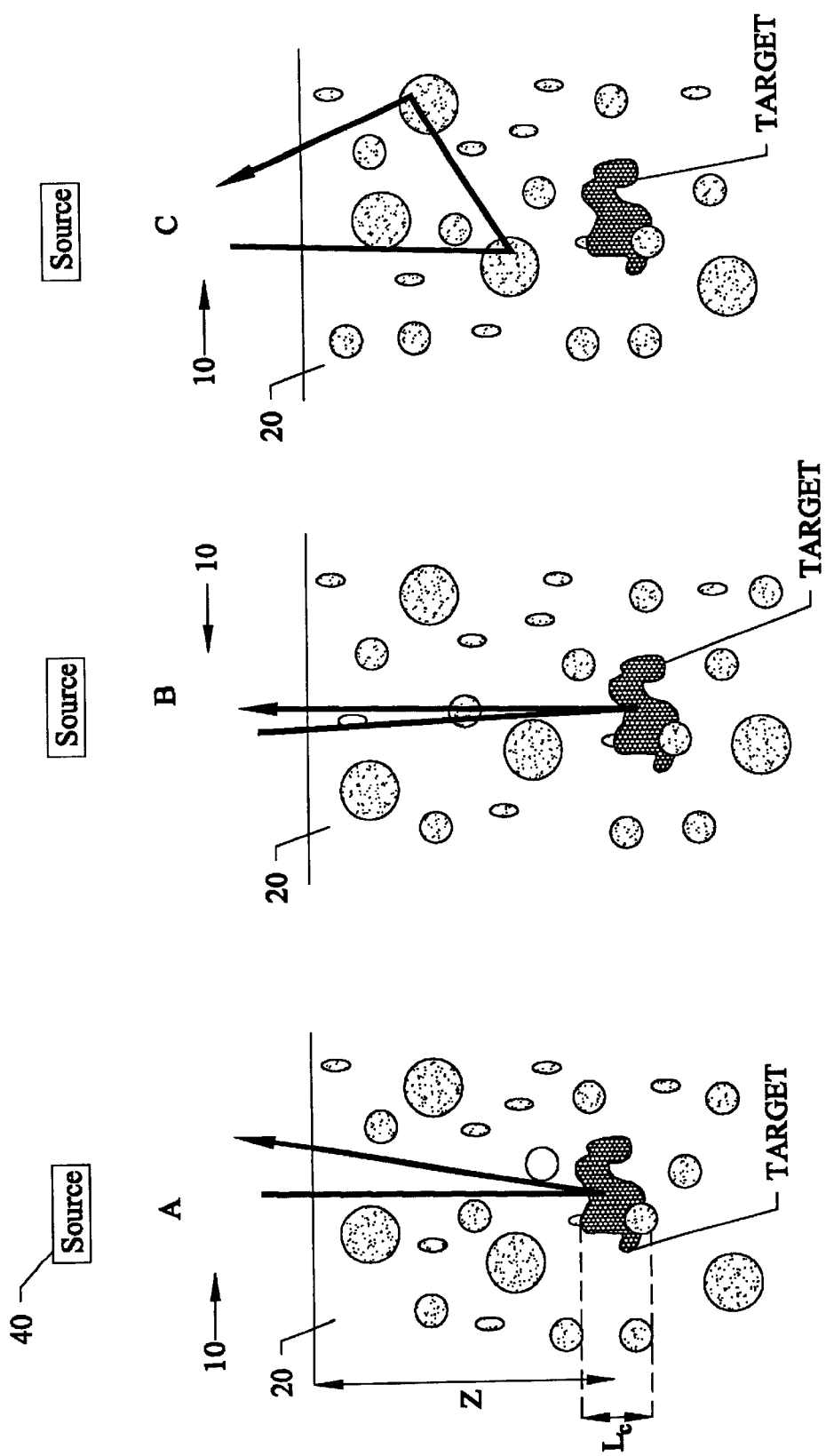
FIGS. 1A, 1B, and 1C show the optical noise scattering signals present in low-coherence images of the prior art.
Figure 2:
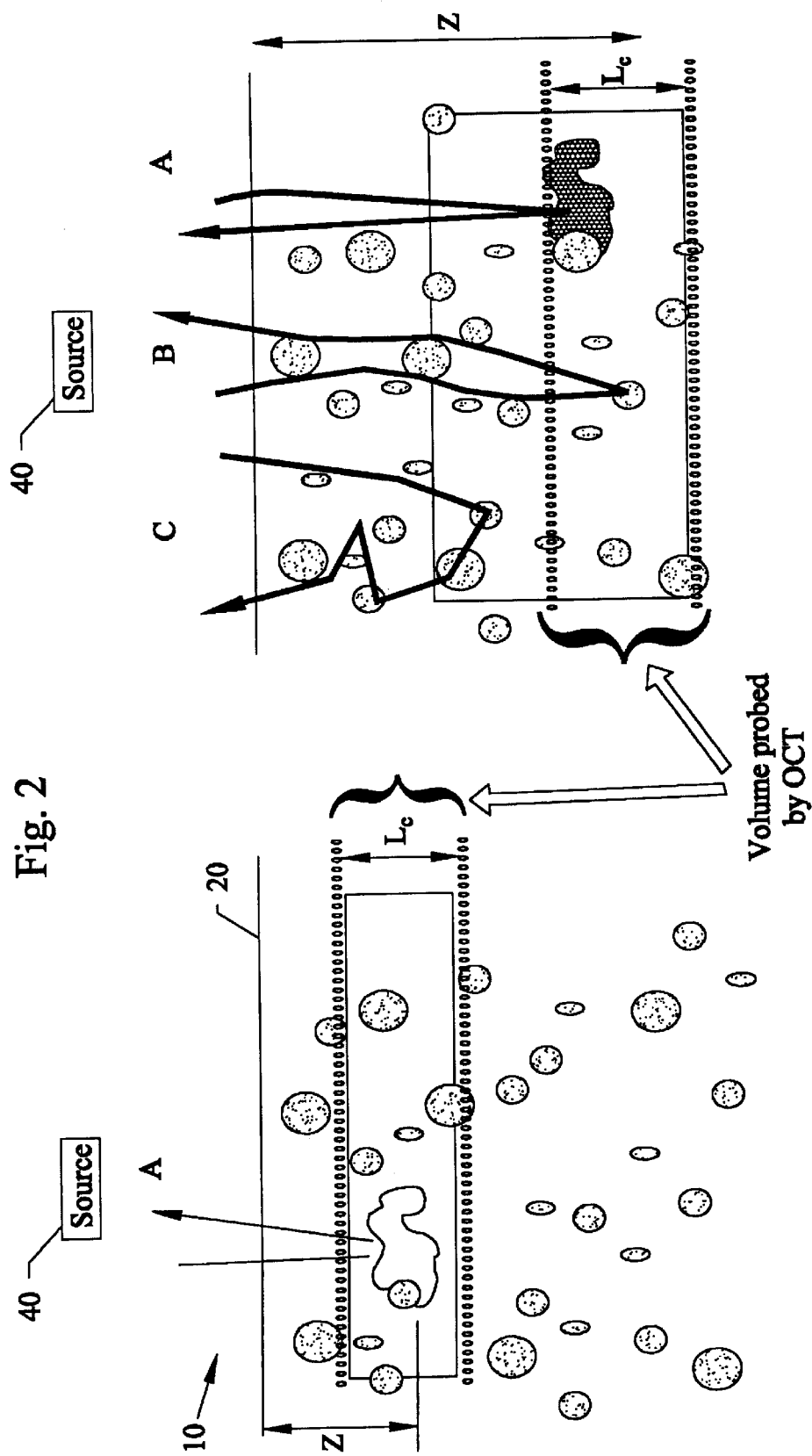
FIG. 2 shows how multiple scattering contributions depend on the targeted depth, z.
Figure 4:
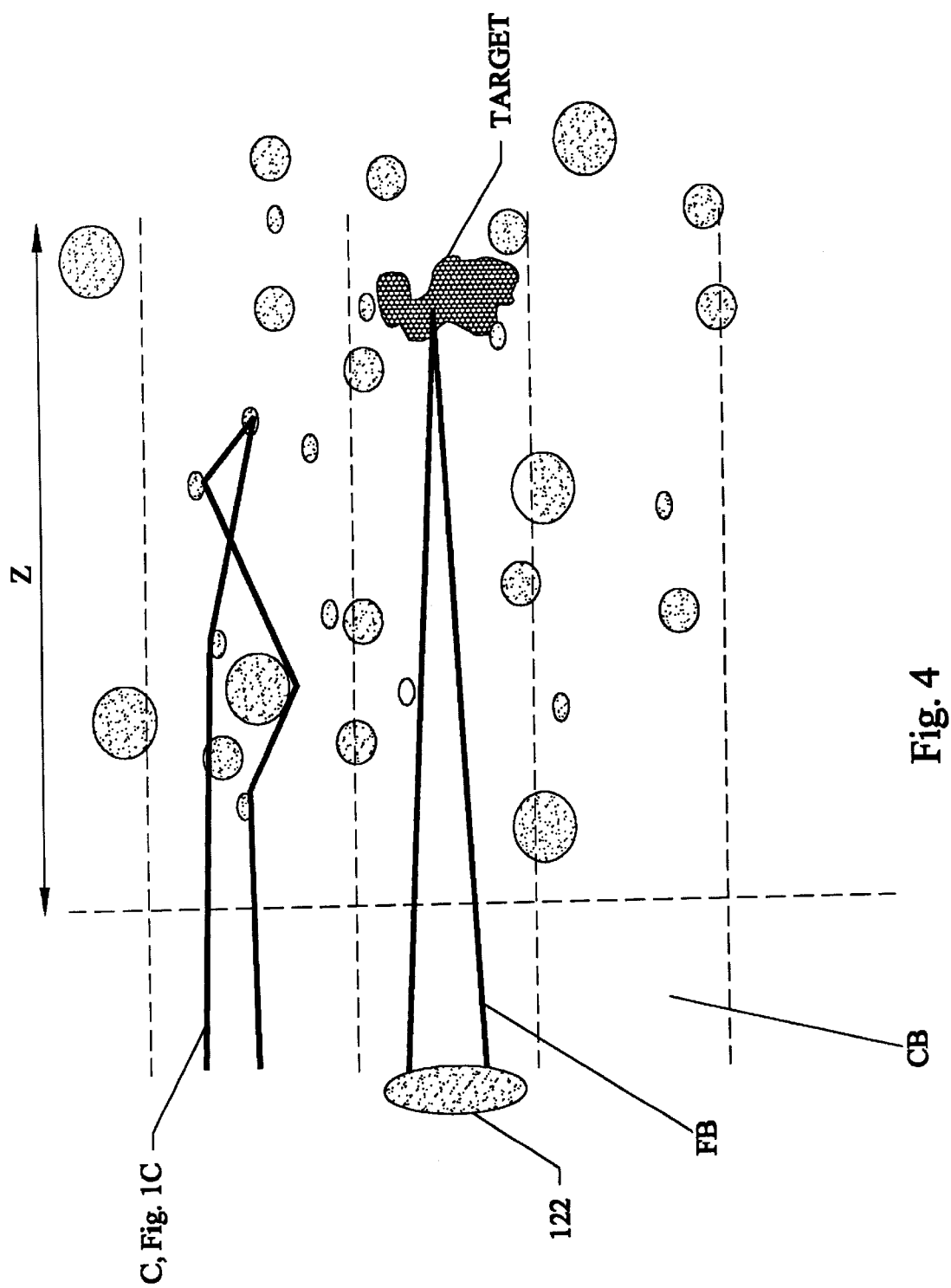
FIG. 4 shows how the collimated beam CB of FIG. 3 is used to record multiple scattering paths of type C(FIG. 1C) and the focused beam FB of FIG. 3, generated by lens 122 is used to select only the paths of type A(FIG. 1A).

FIG. 4 shows how the collimated beam CB of FIG. 3 is used to record multiple scattering paths of type C(previously shown in FIG. 1C) and the focused beam FB generated by lens 122(FIG. 3) is used to select only the paths of type A(previously shown in FIG. 1A).

Figure 5:
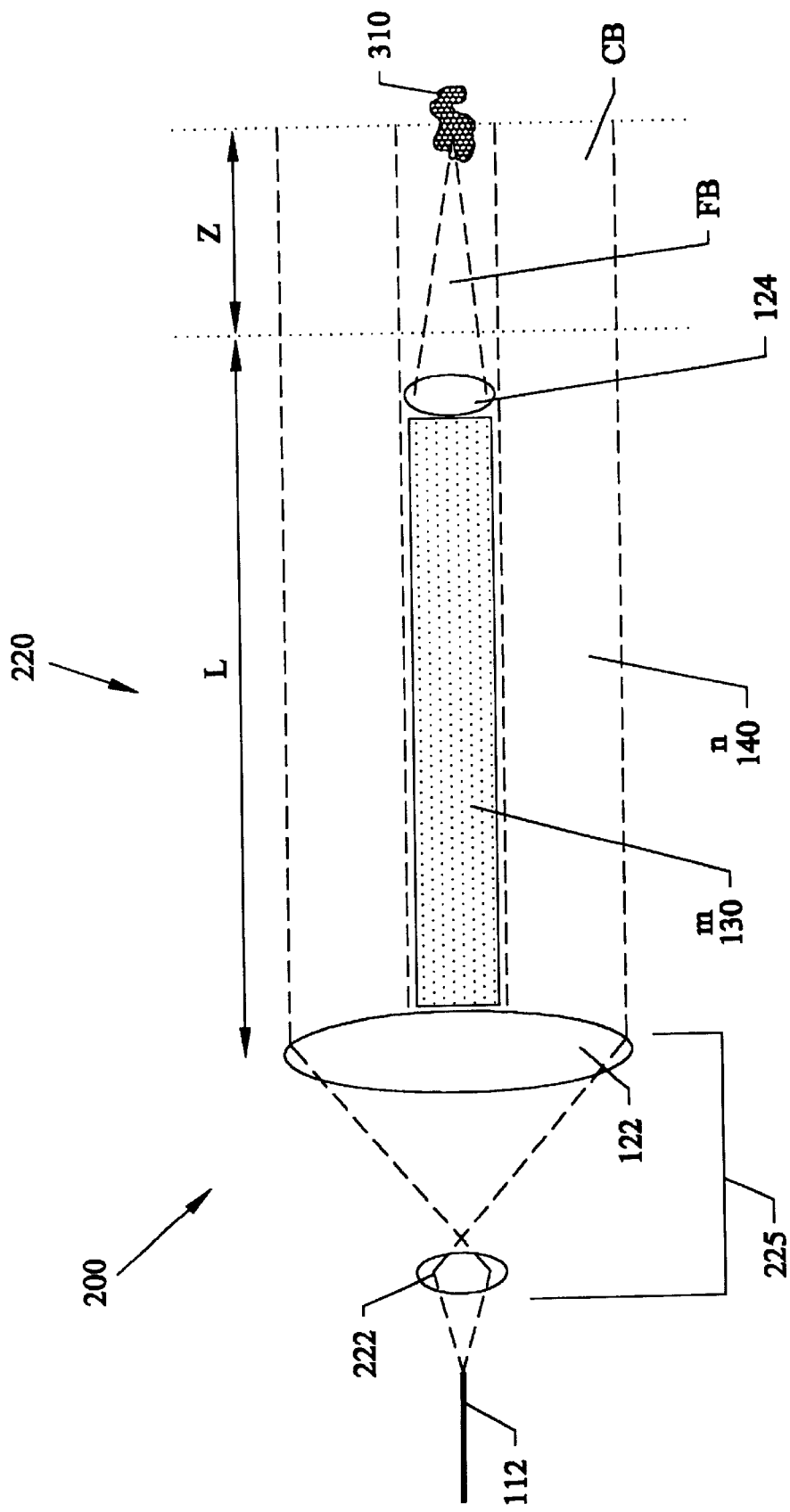
FIG. 5 shows a third embodiment component set-up of the measuring head of FIG. 3 for a fiber-based interferometer.
Figure 6:
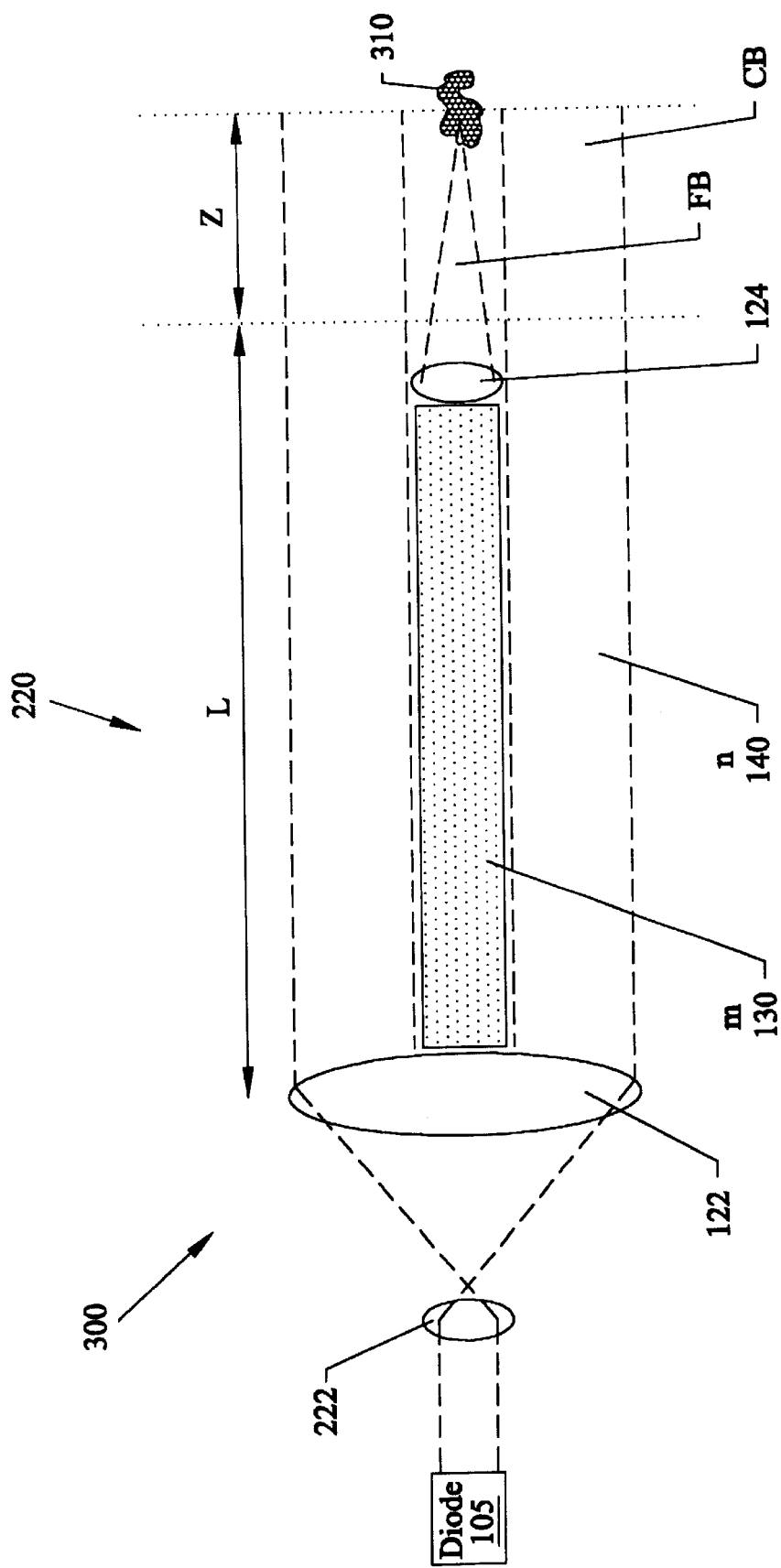
FIG. 6 shows a second embodiment set-up of the measuring head of FIG. 3 for an open-air interferometer.

FIG. 5 shows a second embodiment 200 component set-up of the measuring head of FIG. 3 for a fiber-based interferometer. FIG. 6 shows a third embodiment set-up 300 of the measuring head of FIG. 3 for an open-air interferometer that eliminates the optical fibers 107, 112, 114, 116.

Referring to FIGS. 5–6, the interferometer 200 can be constructed using the basic components of FIG. 3 with the following modifications. A low coherence superluminescent diode 105 such as a Hamatsu L3302 can be used that generates a wavelength of approximately 830 nm. Optical fibers 107, 112, 114 and 116 can be connected to a 2×2 beam splitter 110 such as a Newport F-CPL-S22855. The mirrors Mc and Mf can be mounted on piezoelectric modulators such as ThorLabs AE0203D08 and driven at frequencies Fc of approximately 1 kHz and Ff of approximately 10 kHz by modulator drivers such as Burleigh PZ-150M and frequency generators such as Stanford Research DS340. The collimated beam CB can be formed using a fiber optics collimator 225 that includes a convergent lens 122(previously described) and a convergent lens 222. Collimator 225 can be an OzOptics HPVCO 23-840-S-6.2AS with lens 122 having a diameter of approximately 4 mm. The focused beam FB can be produced by a GRIN lens 224 such as OptoSigma 024-0440 with a total length of L of approximately 5 mm. This allows one to scan sample depth z up to approximately 4 mm. Additional specific selections for the measuring head should allow different measuring ranges.

Figure 7:
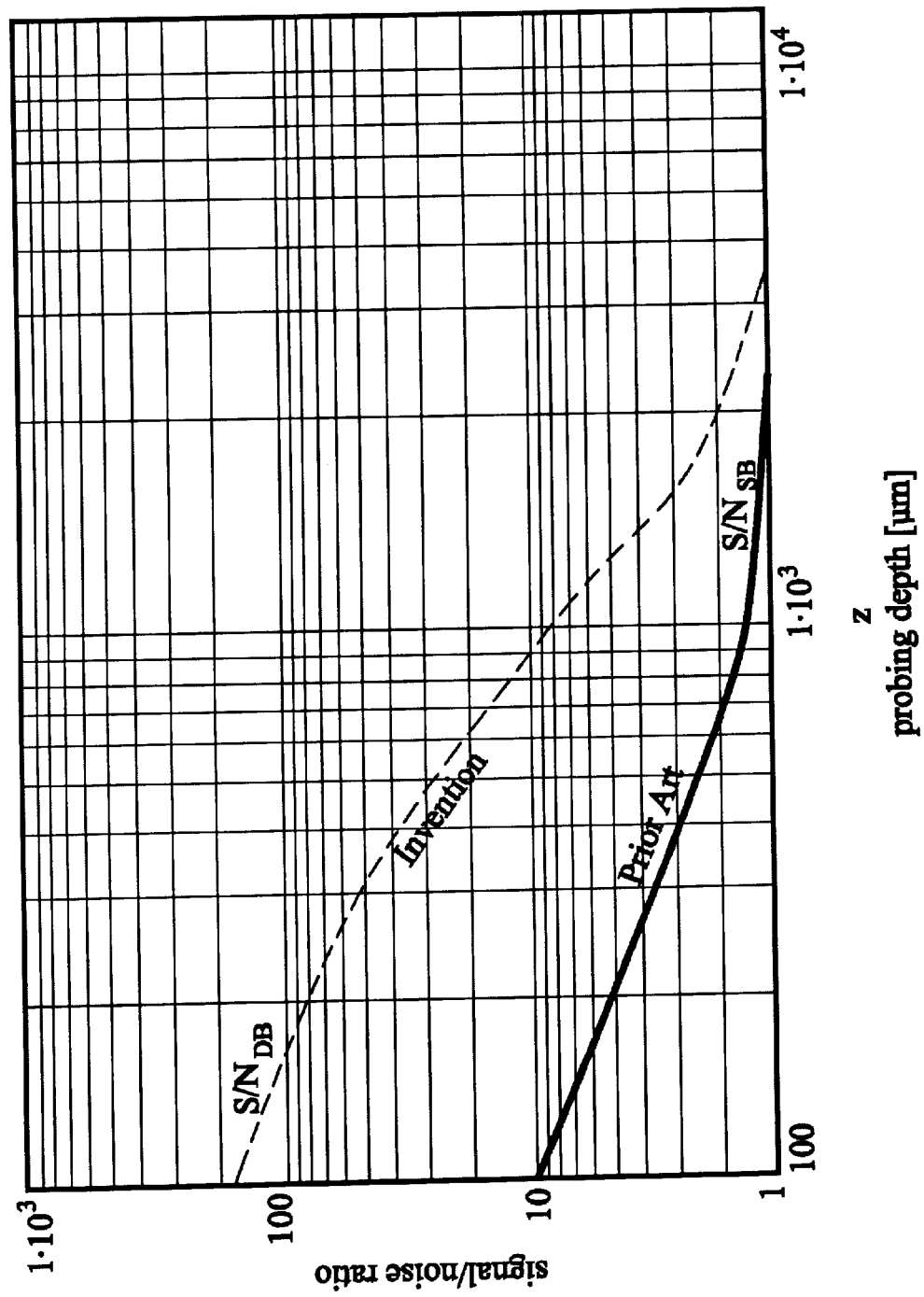
FIG. 7 shows a graph of a signal to noise ratio versus probing(penetration) depth in um for single focused beam S/NSB configuration of the prior art and the subject invention.

A specific example for the use of the novel interferometer refers to measuring the reflectance of a subsurface target which is immersed in a multiple scattering medium characterized by a radiation attenuation length, l. The single scattering signal from the target depends on the depth z, as defined by $SS(z)=A \exp(-2 z/l)$. On the other hand, the multiple scattering component from a diffusive medium varies as defined by $MS(z)=BF(1-\exp(-z/l))$ and $MSC(z)=BC(1-\exp(-z/l))$ for focused and collimated geometry, respectively. See for example, A. Ishimaru, "Wave Propagation and Scattering in Random Media", Academic Press 1978. In these calculations, A, BF, and BC are constants which depend on the specific diameter of the focusing lens, focal distance, as well as the efficiency of the detection system(quantum efficiency, amplification, and the like), and are not important as to showing the signal to noise ratio. The ratio between the intensity readings in the collimated and focused beam can be adjusted electronically such that comparable values are obtained. For example, a typical value could be $BC/BF=0.8$. The novel dual beam system permits one to subtract the backscattered intensity in the collimated beam CB from the corresponding intensity in the focused beam FB. Accordingly, a signal to noise ratio can be estimated for the classical case and for the novel dual beam interferometer configuration. Under classical geometry (focused and single-beam), the signal to noise ratio is given by $SNSB(z)=(SS(z)+MS(z))/MS(z)$ while in the novel dual beam configuration $S/NDB(z)=(SS(z)+MS(z)-MSC(z))/(MS(z)-MSC(z))$. Typical values for attenuation length could be l=1000 microns and the signal to noise ratios can be estimated as a function depth z of the target. FIG. 7 presents these values evaluated for penetration depths up to approximately 10 mm. As can be seen, a sensible increase in the signal to noise ratio is obtained for depths around and over the value of the attenuation length.

FIG. 7 shows a graph of a signal to noise ratio versus probing(penetration) depth in um for single focused beam S/NSB configuration of the prior art and the novel coaxial beams configuration of the subject invention. Referring to FIG. 7, this example shows an increase of over a ten time increase in signal to noise ratio of the subject invention compared to that of the prior art.

The invention can be used in biomedical optics, tissue characterization and diagnosis. In a biomedical application, depth-resolved images in tissue are obtained by scanning the optical head over the region of interest. The resolution of these images, usually OCT images, is limited by the speckle noise produced by multiple scattering in tissue. This application can account quantitatively for such background noise. The ratio of focused and collimated signals can be less sensitive to local variations in tissue.

The invention can further be used in materials characterization, ceramics, composites and other granular media as well as subsurface defects visualization in inhomogenous media.

Since the invention allows for relative measurement, it can be used to enhance the sensitivity of the measurement of local backscattering coefficient in materials such as ceramics, composites, and other granular media. In applications where particle size or density is of interest, the invention minimizes the influence of multiple scattering and therefore reduces the data interpretation.

For defect applications, the target 310(FIG. 3) can be a defect such as an inclusion, void, crack, and the like, in a composite material such as ceramics and other materials which scatter light. The ratio between focused and collimated signals enhances the signal to noise ratios. In this application, the signal corresponds to scattering from the subsurface defect and the optical noise corresponds to multiple scattering from the surrounding medium 300.

Although the preferred embodiment of the subject invention is described for use with air and tissue applications, the invention can be applied to other applications such as but not limited to defect locations in nonmedical mediums.

The subject invention can be applicable for high power and other applications where much smaller wavelengths are desirable, such as but not limited to extreme ultraviolet (EUV), and soft X-ray regions.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

I claim:

1. A dual beam low-coherence interferometer with improved signal-to-noise ratio, comprising:

means for generating a low coherence light source;

means for splitting the light source into at least an outgoing signal and a reference signal;

a waveguide for receiving the outgoing signal, the waveguide having a first lens for forming a collimated beam from the outgoing signal onto a target, and the waveguide having
a second lens for forming a focused beam from the outgoing signal onto the target;
a reference arm for receiving the reference signal, and having a first means for introducing a first modulated frequency, and a second means for introducing a second modulated frequency; and
a detector for detecting a frequency value of the collimated beam and a frequency value of the focused beam from the target, wherein an image of the target can be formed by comparing the frequency value of the collimated beam from the target with the first modulated frequency, and comparing the frequency value of the focused beam from the target with the second modulated frequency without multiscattering signal noise effects.

2. The dual beam low-coherence interferometer of claim 1, wherein the low coherence light source includes:
a super luminescent diode.

3. The dual beam low-coherence interferometer of claim 1, wherein the first lens and the second lens each include:
a convergent lens.

4. The dual beam low-coherence interferometer of claim 3, wherein the waveguide further comprises;
a cylindrical waveguide having two refractive indices between the first convergent lens and the second convergent lens.

5. The dual beam low-coherence interferometer of claim 1, wherein the target includes:
an image in a tissue medium, wherein the light source passes into the tissue medium.

6. The dual beam low-coherence interferometer of claim 1, wherein the target includes:
a particle in a granular media, wherein the light source passes into the granular media.

7. The dual beam low-coherence interferometer of claim 6, wherein the granular media is chosen from at least one of:
a ceramic and a composite.

8. The dual beam low-coherence interferometer of claim 1, wherein the target includes:
a defect in a light scattering material medium.

9. The dual beam low-coherence interferometer of claim 1, wherein the splitting means includes: a 2×2 beam splitter.

10. The dual beam low-coherence interferometer of claim 1, wherein the first means and the second means each include: a mirror.

11. A dual beam low-coherence interferometer measuring head, comprising:
a source for generating an optical signal;
means for splitting the optical signal into at least an outgoing signal and a reference signal;
waveguide means for generating coaxial beams from the outgoing signal to a subsurface target further comprising:
means for forming a collimated beam; and
means for forming a focused beam from the collimated beam
a reference arm for receiving the reference signal, and having a first means for introducing a first modulated frequency, and a second means for introducing a second modulated frequency; and
detector means for detecting a frequency value of each of the coaxial beams from the target, wherein an image of the target is detected by comparing each of the frequency values of the coaxial beams from the target with the first modulated frequency and with the second modulated frequency with an enhanced signal to noise ratio.

12. The dual beam low-coherence interferometer of claim 11, wherein the splitting means includes: a 2×2 beam splitter.

13. The dual beam low-coherence interferometer of claim 11, wherein the collimated beam forming means includes:
a convergent lens.

14. The dual beam low-coherence interferometer of claim 12, wherein the collimated beam forming means includes:
a collimator.

15. The dual beam low-coherence interferometer of claim 11, wherein the source for generating an optical signal includes:
an optical fiber based transmission medium.

16. The dual beam low-coherence interferometer of claim 11, wherein the source for generating an optical signal includes:
an open-air based transmission medium.

17. The dual beam low-coherence interferometer of claim 11, wherein the first means and the second means each include: a mirror.

18. The dual beam low-coherence interferometer of claim 11, wherein the waveguide means includes: a cylindrical waveguide.

* * * * *